United States Patent [19]
Goddard

[11] 3,757,328
[45] Sept. 4, 1973

[54] RADAR SYSTEMS
[75] Inventor: Frederick Charles Goddard, Malvern, England
[73] Assignee: Minister of Aviation, in Her Majesty's Government of the United Kingdom of Great Britain and Northern Ireland, London, England
[22] Filed: Dec. 28, 1964
[21] Appl. No.: 421,728

[30] Foreign Application Priority Data
Jan. 7, 1964 Great Britain.......................... 788/64

[52] U.S. Cl.................. 343/7.7, 343/5 EM, 343/7.9
[51] Int. Cl............................. G01s 7/20, G01s 9/42
[58] Field of Search..................... 343/7.7, 7.9, 5 EM

[56] References Cited
UNITED STATES PATENTS
2,426,189   8/1947   Espenschied .................... 347/7.9 X Primary Examiner—Malcolm F. Hubler
Attorney—Larson, Taylor & Hinds

EXEMPLARY CLAIM

1. Radar apparatus including a visual display, means for displaying on the visual display an image formed from elements of contrasting brightness and means for displaying radar returns from moving targets as relatively light elements and radar returns from stationary objects as relatively dark elements against a background of intermediate brightness.

1 Claim, 3 Drawing Figures

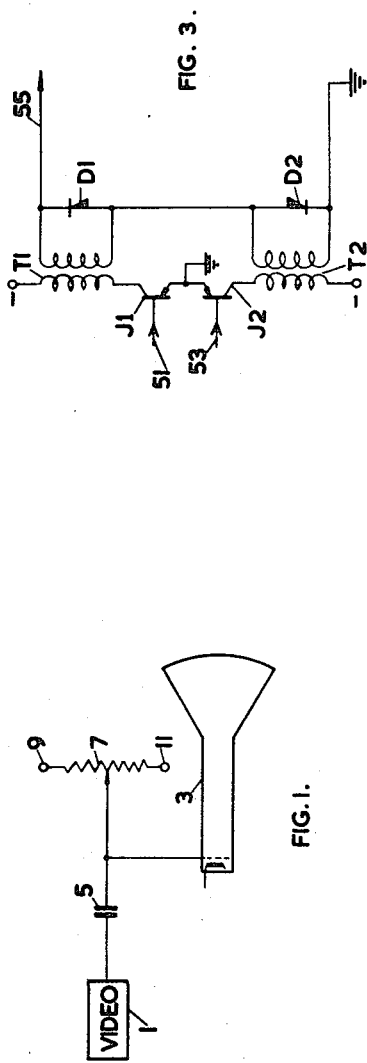
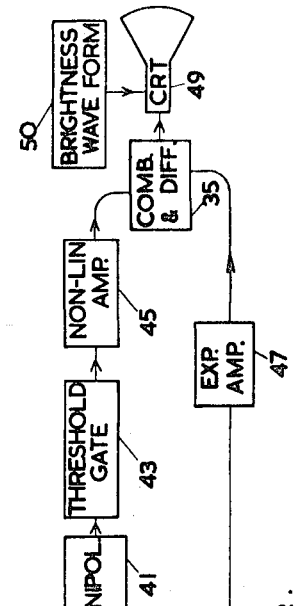

RADAR SYSTEMS

The present invention relates to radar systems.

According to the present invention there is provided radar apparatus including a visual display, means for displaying on the visual display an image formed from elements of contrasting brightness and means for displaying radar returns from moving targets as relatively light elements and radar returns from stationary objects as relatively dark elements against a background of intermediate brightness.

Embodiments of the invention will be described by way of example and with reference to the drawings filed herewith, in which:

FIG. 1 is a circuit diagram of part of a radar system in the barest outline;

FIG. 2 is a block diagram of part of a Moving Target Indicator radar system; and FIG. 3 is a circuit diagram, in greater detail, of part of the circuit diagram of FIG. 2.

FIG. 1 is a circuit diagram of part of a radar system in the barest outline. The video output 1 of a conventional radar is applied to the grid of a cathode ray tube via a capacitor 5. The grid of the cathode ray tube 3 is directly connected to the moving contact of a potentiometer 7 connected between two different potential sources 9, 11.

The action of the circuit is as follows. The amplification stages contained in the video stage 1 are so arranged that the output signal provides negative-going pulses for each echo pulse received by the radar. In this way the display on the cathode ray tube 3 shows echo pulses as dark areas on a bright background. The potentiometer 7, which is a brightness control, is so adjusted that the phosphor on the cathode ray tube is excited at about half its full brightness in the absence of echo signals.

By this arrangement unwanted clutter signals which are evanescent in nature, for example echoes from rain storms, provide less excitation of the phosphor compared with the background rather than more, and hence do not remain on the tube for longer than one scanning period. When a new sector is scanned by the radar aerial the old signals disappear immediately because their afterglow is less than that of the background. Furthermore, even relatively weak echoes will have some effect on the display; there is no minimum signal magnitude below which the cathode ray tube electron beam has insufficient energy to excite the screen phosphor.

With this arrangement there is naturally an optimum relationship between the speed of an echo trace across the cathode ray tube screen and the length of afterglow. A tube should be chosen having a phosphor the afterglow time of which is matched to the expected speed of echo traces across the tube.

Since the screen of the tube is excited in the absence of an echo the flyback of the tube scan will show up on the screen unless a blanking waveform is applied in known manner to the brightness control of the tube. Such a waveform is well known to those in the art and will be referred to hereinafter as the Brightness Waveform.

FIG. 2 is a block diagram of part of a Moving Target Indicator radar system. Input video signals appearing on a channel 21 frequency modulate an oscillator 23. The output of the oscillator 23 is applied to one input of a phase discriminator 25. The other input of the phase discriminator 25 is provided by the output of the oscillator 23 via a delay 27 and an amplifier 29. The output of the amplifier 29 is also connected to the delay line 27 via a timing circuit 31 which provides the timing for the radar trigger pulse via a channel 33. The output of the phase discriminator 25 is applied to signal combining and differencing circuits 35 via a filter 37, a differentiator 39, a unipolarity convertor 41, a threshold gate 43 and a non-linear amplifier 45 in turn. The video output on the channel 21 is also applied to the combining and differencing circuits 35 via an exponential amplifier 47. The output of the combining and differencing circuits 35 is applied to a cathode ray tube 49. The brightness waveform referred to above is applied to the cathode ray tube 49 from a brightness waveform generator 50.

The action of the circuit is as follows. Since the timing circuit 31 provides the timing for the radar trigger pulse, the delay in the delay line 27 (plus any delay in the amplifier 29) is equal to the time between adjacent transmitted pulses. The phase discriminator 25, therefore, will have the present trace as one input (from the oscillator 23 direct) and the immediate past trace as the other input (from the amplifier 29). The phase discriminator 25 effectively subtracts each signal from its successor, whereby echoes from stationary targets are cancelled. Therefore echoes from moving targets only appear at the output of the phase discriminator 25.

The phase discriminator 25 is a type of mixer. If two signals enter a mixer then the output consists of the original signals, the product of the signals and other harmonics. If signals are $A_1 \sin \omega_1 t$ and $A_2 \sin (\omega_2 t + \phi)$ respectively, where $A_1$, $A_2$ are the two amplitudes $\omega_1$, $\omega_2$ are the two angular frequencies and $\phi$ is the relative phase, then the product of the signals is $$A_1 A_2 \sin \omega_1 t \cdot \sin (\omega_2 t + \phi),$$
$$\text{or } A_1 A_2 /2 \{\cos [(\omega_1 - \omega_2)t - \phi] - \cos [(\omega_1 + \omega_2)t + \phi]\}$$

In the cancellation system the two inputs consist of the delayed and undelayed carriers. Since the deviation is small compared with the carrier frequency, $$\omega_1 - \omega_2 << \omega_1 \text{ or } \omega_2.$$

The low pass filter 37 follows the phase discriminator 25 and signals with frequencies $\omega_1$, $\omega_2$, $\omega_1 + \omega_2$ and other harmonics are rejected leaving an output of the form $$A_1 A_2 /2 \cos [(\omega_1 - \omega_2)t - \phi]$$

If no input signals are present $\omega_1 = \omega_2 = \omega$, the angular frequency of the undeviated oscillator. The output of the filter 37 is then $A_1 A_2/2 \cos \phi$, where $\phi$ is the relative phase between the delayed and undelayed carriers. In the absence of any modulating signal the oscillator stability is such that its frequency remains constant for a time longer than the delay time. Hence $\phi$ tends to remain constant and a constant voltage level appears at the mixer output which has an arbitrary value depending on $\phi$.

Successive return signals from a stationary target will have equal amplitudes and the video pulses will each deviate the oscillator by the same amount. The delayed and undelayed carrier entering the mixer will have the same frequency deviation for the duration of the pulse so that at any instant the signals entering the mixer have the same frequencies. The output of the filter 37 is then the steady level: $A_1A_2/2 \cos \phi$.

Successive video pulses from a moving target, however, will deviate the oscillator by different amounts so that for the duration of the pulse, the signals entering the phase discriminator 25 have different frequencies. A beat frequency appears at the output of the phase discriminator 25 for the duration of the pulse.

It is arranged that the time period $T$ of the beat frequency is large compared with the pulse width $t$, or, more exactly, $$T > 2t.$$

In this arrangement the pulse samples less than half the beat wave and the output of the phase discriminator 25 and the filter 37 shows a more sudden change in level. This output is then differentiated in the differentiator 39 giving a pulse with an amplitude proportional to the change in level. Hence for pulses from stationary targets the output of the phase discriminator 25 is constant but for pulses from moving targets there will be a sudden change of level which is converted into a pulse. The pulse may be negative-going or positive-going and is rectified in the unipolarity converter 41.

In practice the output of the unipolarity converter 41 may contain a certain amount of stationary target information and amplifier noise but this will be small compared with the wanted signals. The threshold gate 43 is set at such a level that it is not excited by the noise but only by the wanted signals. The wanted signals are amplified in the non-linear amplifier 45 and applied to the combining and differencing circuits 35. The reason for the non-linearity of the amplifier 45 is that small signals need more amplification than large ones to make them appear on the screen of the cathode ray tube 49.

Meanwhile the uncancelled video output on the channel 21 is also applied to the combining and differencing circuits 35 via a non-linear amplifier, viz the exponential amplifier 47.

The effect of the combining and differencing circuits 35 is as follows. The moving target information from the non-linear amplifier 45 is presented to the cathode ray tube 49 in such a way that they modulate the trace to give bright spots on the tube. On the other hand the uncancelled video information from the exponential amplifier 47 is presented to the cathode ray tube 49 in such a way that it modulates the trace to give dark spots on the tube. Clearly the average brightness of the tube must be set at a moderate level.

Moving target information, however, also appears in the uncancelled video information, and to save the two signals cancelling each other out completely (whereby no moving target information whatsoever is given to the cathode ray tube) the magnitude of the white signal compared with the black (adjusted by adjusting the amplifiers 45 and 47) may be such that the white signal swamps the black signal. Alternatively the white signals may be broadened or phase advanced or retarded compared with the black signals.

FIG. 3 is a circuit diagram of the combining and differencing circuits 35 of FIG. 2. A conncetion 51 from the non-linear amplifier 45 of FIG. 2 is made to the base of a transistor J1, whose emitter is earthed and whose collector is connected to a negative supply source via the primary winding of a transformer T1. Similarly a connection 53 from the exponential amplifier 47 of FIG. 2 is made to the base of a transistor J2, whose emitter is earthed and whose collector is connected to a negative supply source via the primary winding of a transformer T2. The secondary windings of the transformers T1 and T2 are connected in series between earth and a connection 55 to the cathode of the cathode ray tube 49 of FIG. 2. A diode D1 is connected across the secondary winding of the transformer T1 and a diode D2 is connected across the secondary winding of the transformer T2. The senses in which the secondary windings of the transformers T1 and T2 are connected and the senses in which the diodes D1 and D2 are connected are such that a moving target indicating pulse from the non-linear amplifier 45 produces a single negative pulse with no overshoot on the connection 55 and an uncancelled video pulse from the exponential amplifier 47 produces a single positive pulse with no overshoot on the connection 55, whereby moving target information appears white and uncancelled clutter information appears black on the cathode ray tube screen.

I claim:

1. Radar apparatus including a visual display, means for displaying on the visual display an image formed from elements of contrasting brightness and means for displaying radar returns from moving targets as relatively light elements and radar returns from stationary objects as relatively dark elements against a background of intermediate brightness.

* * * * *